United States Patent
Schadler

(10) Patent No.: US 6,825,438 B1
(45) Date of Patent: Nov. 30, 2004

(54) MULTI-HEAD LASERS CUTTING/WELDING CELL WITH VIBRATION CONTROL

(75) Inventor: Rickie Schadler, Fleetwood, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/446,818

(22) Filed: May 29, 2003

(51) Int. Cl.$^7$ .............................................. B23K 26/20
(52) U.S. Cl. .................................................. 219/121.64
(58) Field of Search ........................ 219/121.6, 121.63, 219/121.64, 121.82, 121.85

(56) References Cited

U.S. PATENT DOCUMENTS

| | | | |
|---|---|---|---|
| 4,654,505 A | * | 3/1987 | Sciaky et al. |
| 5,001,323 A | * | 3/1991 | Matsutani et al. |
| 5,064,991 A | * | 11/1991 | Alborante |
| 5,229,571 A | * | 7/1993 | Neiheisel |
| 5,481,083 A | | 1/1996 | Smyth, Jr. |
| 5,854,460 A | | 12/1998 | Graf et al. |
| 5,910,894 A | | 6/1999 | Pryor |
| 6,337,464 B1 | | 1/2002 | Takaoka et al. |
| 6,339,207 B1 | | 1/2002 | Bishop |
| 6,429,403 B1 | * | 8/2002 | Nakayama |
| 6,476,344 B1 | | 11/2002 | Fields, Jr. et al. |
| 2001/0017291 A1 | | 8/2001 | Bishop |

* cited by examiner

Primary Examiner—Samuel M. Heinrich
(74) Attorney, Agent, or Firm—Liniak, Berenato & White

(57) ABSTRACT

Multiple cutting heads are provided in a single cutting cell whereby vibrations created in one cutting head is isolated from the other cutting head(s). Each cutting head is supported by separate support structures to prevent the transfer of vibration from one cutting head to another. The multi-head laser cell includes a series of support structures that are staggered with respect to each other so that the lasers are isolated from each other. In the preferred embodiment, each laser cutting head has a dynamic pre-programmed operating zone to prevent collisions with other cutting heads. The control system will have the proper communications needed to coordinate motion used to develop the dynamic pre-programmed operating zone. Furthermore, the laser cutting heads preferably have multi-axes motion control; e.g., five axis motion control.

11 Claims, 2 Drawing Sheets

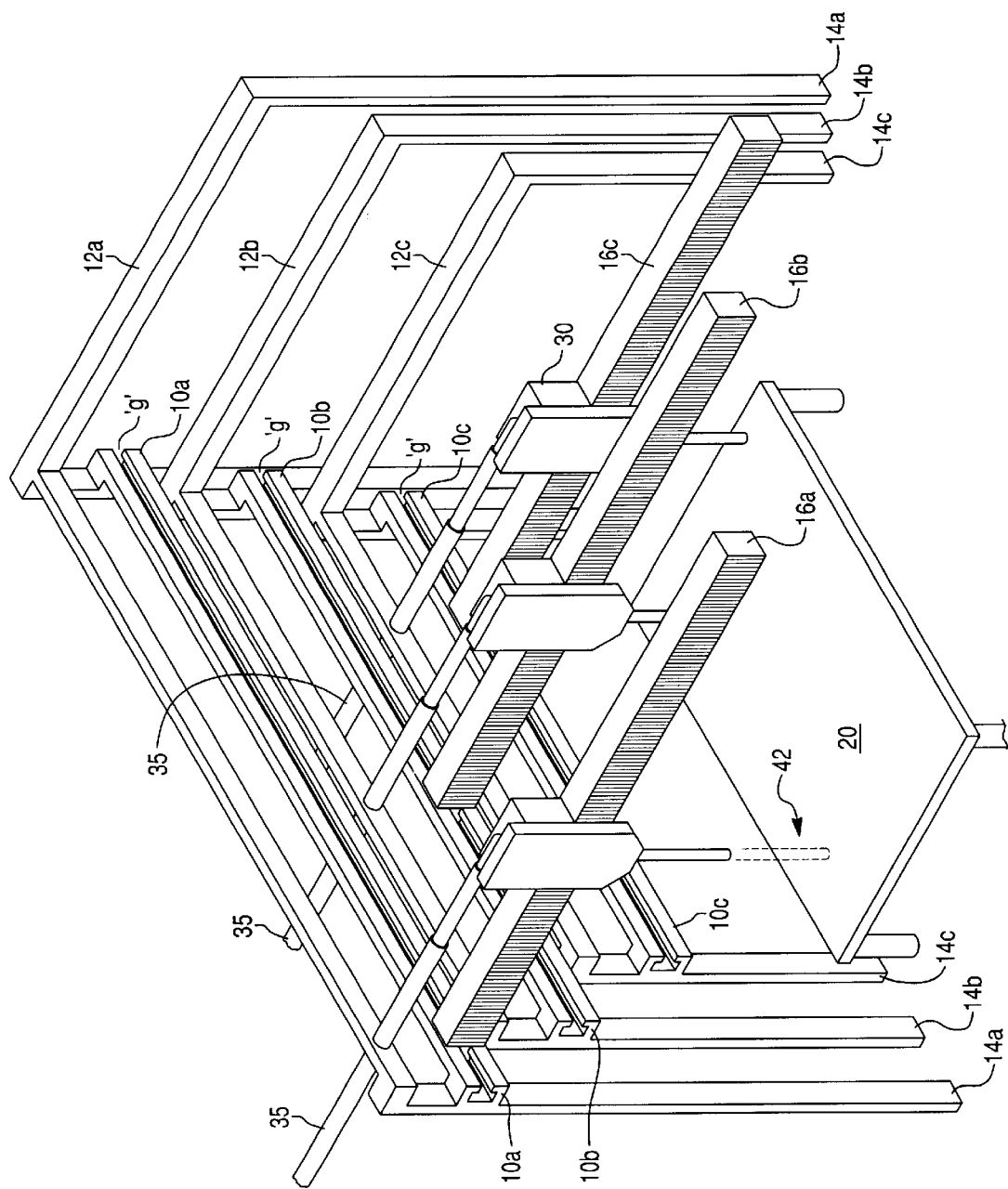
Fig. 1
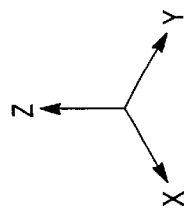

MULTI-HEAD LASERS CUTTING/WELDING CELL WITH VIBRATION CONTROL

BACKGROUND OF THE INVENTION

1. Field of the Invention

The present invention relates generally to a new automated laser cutting/welding system configured to produce, for example, an improved welded or cut work piece, such as an automotive body panel, side rail or structure, and a system and method for the manufacture thereof that includes an improved laser cutter/welder.

2. Background of the Invention

In the past, work pieces such as body panels or side rails for use in the automotive vehicle industry were made by stamping or drawing the panel from either a single blank of a ductile sheet metal material, including steel, or from a plurality of such blanks that were previously welded together.

The automotive vehicle industry is very competitive with respect to, among other things, quality, raw material costs, and manufacturing times required to completely fabricate and assemble a vehicle. To remain competitive, manufacturers have continuously expended enormous resources to contain, if not reduce, material costs by reducing part weight, part count, and manufacturing time while maintaining the needed high degree of quality. A considerable amount of such resources have been directed to improving and automating routine tasks such as the fastening together of various work pieces and vehicle parts such as, for example, body panels for fenders, quarter panels, trunk lids, engine compartment hoods, vehicle doors, and other various components.

Previously, multi-part sheet metal blanks have been welded together into a single work piece before being stamped into a final shape. These blanks were prepared by a variety of fastening techniques including chemical, arc, and $CO_2$/Nd:Yag laser welding, riveting, bolting, cold forming, and similar methods. Of particular interest in recent years is the use of more efficient laser welding using $CO_2$/Nd:Yag lasers in automated, numerically controlled manufacturing processes. Such laser welding can be accomplished for joining together sheet metal blanks at a common seam by means of, for example, a lap weld, or a butt weld. Butt welds are often preferred because only a single seam needs to be welded in contrast to lap joint which usually require that two seams be welded.

Laser cutting machines of the type to which the present invention is directed are well known in the art. In their most usual form, they comprise an elongated main frame having upstanding front or operator-side and rear or beam-side portions in substantially parallel spaced relationship with a cutting zone and a loading/unloading zone located therebetween. The parallel, upstanding, main frame portions are generally described as extending in the directions of the X-axis, while the Y-axis extends transversely of these main frame portions and the Z-axis is vertically oriented. The machine is provided with a gantry, the ends of which are mounted on the upstanding frame members for movement therealong in the X-axis directions. The gantry carries a carriage-mounted laser cutting head capable of traversing along the gantry in the Y-axis direction. Movement of the gantry in the X-axis directions and movement of the laser head carriage in the Y-axis directions assure that the laser cutting head can be located anywhere in the cutting zone of the machine.

$CO_2$/Yag laser cutting cells available today primarily comprises one cutting head; although, some system utilize two cutting heads mounted to a single structure. When two heads are mounted on a single structure, vibrational problems arise because the starting and stopping moments from one cutting head create vibrations in the other cutting head. This vibration creates swiggles or irregularities in the cuts created by the vibrating cutting head.

SUMMARY OF THE INVENTION

This invention provides multiple cutting heads in a single cutting cell whereby vibrations created in one cutting head is isolated from the other cutting head(s).

The invention is a laser cutting cell having more than one cutting head in the cell, whereby each cutting head is supported by separate support structures to prevent the transfer of vibration from one cutting head to another. The multi-head laser cell includes a series of support structures that are staggered/stacked with respect to each other so that the lasers are isolated from each other. The x-direction rails and laser guides are mounted in staggered heights.

In the preferred embodiment, each laser cutting head has a pre-programmed dynamic operating zone to prevent collisions with other cutting heads. Furthermore, the laser cutting heads preferably have multi-axes motion control; e.g., five axis motion control.

These and other benefits of the present invention will become apparent with reference to the following drawings and associated written description.

BRIEF DESCRIPTION OF THE DRAWINGS

FIG. 1 is a schematic perspective view showing multi-head laser cell including a series of one-sided support structures that are staggered with respect to each other.

DETAILED DESCRIPTION OF PREFERRED EMBODIMENT

Figure 2:
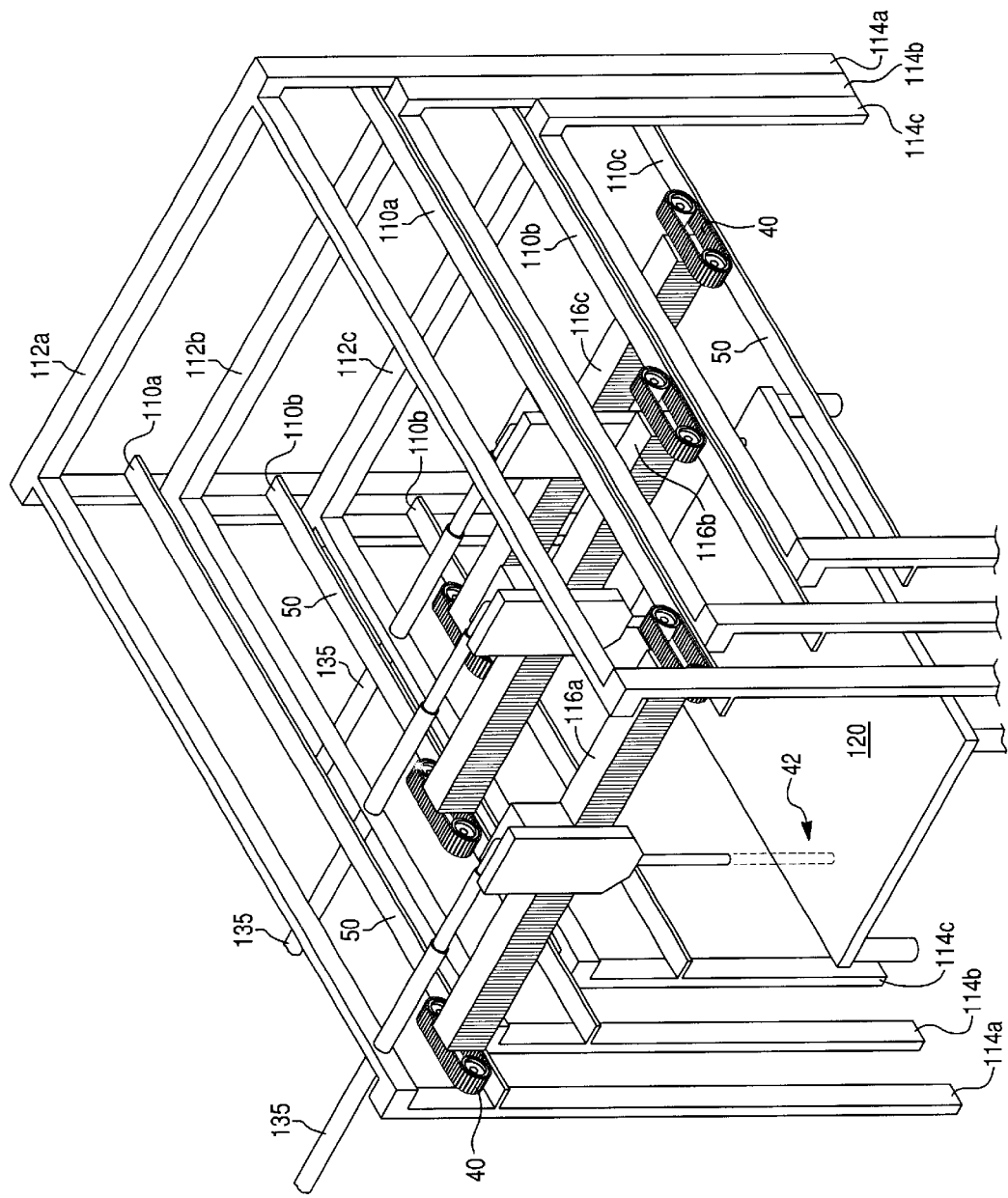
FIG. 2 is a schematic perspective view showing an alternate multi-head laser cell including a series of two-sided support structures that are staggered with respect to each other.

This invention is a stacked, staggered series of gantry supports, having a laser and laser delivery system mounted to corresponding numerically controlled carriages. The gantry and carriage assemblies are of such construction and strength to support a high powered laser typically used in the automotive industry. The gantry is provided with means to rapidly transport the laser and laser delivery system, about the gantry, allowing the laser delivery system to provide a laser beam to any x, y, z coordinate within the workcell of the gantry. The gantry may have a numerical control console that directs the movement of the carriage and laser delivery system, such that the gantry can perform preprogrammed manufacturing methods on various workpieces.

Referring to the drawings more particularity by reference numbers, FIG. 1 shows a series (i.e., three shown in FIG. 1) of numerically controlled gantry assemblies having X, Y and Z coordinates as indicated. The gantry assemblies are supported on a single side as described below and the assemblies can be controlled by a conventional numerically controlled system as known by those of skill in the art. The gantry assemblies each have an x-beam 10a, 10b, 10c attached to a respective end beam 12a, 12b, 12c which are respectively supported by a plurality of support posts 14a, 14b, 14c that elevate the end beams 12a, 12b, 12c and x-beams 10a, 10b, 10c above a workcell 20. The support posts 14a, 14b, 14c, x-beams 10a, 10b, 10c and end beams 12a, 12b, 12c are made from a high strength material of sufficient dimension to provide a rigid structure.

Resting essentially perpendicular to the X-beams 10a, 10b, 10c are respective Y-frames 16a, 16b, 16c. The Y-frames 16a, 16b, 16c have respective X-drive mechanisms (not shown) that independently move the Y-frames 16a, 16b, 16c along the X-axis of the gantry assemblies. The X-axis drive mechanisms may be a rack and pinion drive as shown in FIG. 1, where electric motors drive spur gears along racks that are located along grooves 'g' in the x-beams 10a, 10b, 10c or in any other manner know to those of skill in the art—taking into account the other aspects of the instant invention set forth herein. The X-axis drive mechanisms and associated control provides accurate location of the Y-frames 16a, 16b, 16c as they independently move along the X-axis of the gantry assemblies.

In the alternate embodiment shown in FIG. 2, the multi-head laser cell includes a series of two-sided support structures that are staggered with respect to each other, whereby the X-axis drive mechanisms may be a track drive system as shown in FIG. 2, where electric motors drive a rolling treads 40 along tracks 50 that are located along the x-beams 110a, 110b, 110c or in any other manner know to those of skill in the art—taking into account the other aspects of the instant invention set forth herein.

FIG. 2 shows a series (i.e., three shown in FIG. 1) of numerically controlled gantry assemblies having X, Y and Z coordinates as indicated. The gantry assemblies are supported on two opposite sides as described below and the assemblies can be controlled by a conventional numerically controlled system as known by those of skill in the art. The gantry assemblies each have x-beams 110a, 110b, 110c attached to a respective end beam 112a, 112b, 112c which are respectively supported by a plurality of support posts 114a, 114b, 114c that elevate the end beams 112a, 112b, 112c and x-beams 110a, 110b, 110c above a workcell 120. The support posts 114a, 114b, 114c, x-beams 110a, 110b, 110c and end beams 112a, 112b, 112c are made from a high strength material of sufficient dimension to provide a rigid structure.

Resting essentially perpendicular to the X-beams 110a, 110b, 110c are respective Y-frames 116a, 116b, 116c. The Y-frames 116a, 116b, 116c have respective X-drive mechanisms that independently move the Y-frames 116a, 116b, 1116c along the X-axis of the gantry assemblies. The X-axis drive mechanisms and associated control provides accurate location of the Y-frames 16a, 16b, 16c as they independently move along the X-axis of the gantry assemblies.

The X and Y drive mechanisms can be controlled by a conventional numerical control console (not shown) that provides input to the mechanism's electric motors in accordance with a computer program that is loaded into the console. The combination of drive mechanisms and console allows the carriage to be located along any series of x, y coordinates in the gantry workcell 12, 120, in accordance with the instructions of the console program, as is well known in the art.

Mounted on the carriage 30, 130 is a laser system 40. The laser delivery system provides a laser beam 42 that is directed to a workpiece (not shown) disposed in the workcell 12, 120. The laser delivery system typically utilizes a telescoping tube assembly 35, 135 that houses a mirror arrangement that delivers the laser beam 42 from a source to the area of the workcell 12, 120 or a fiber optic cable. The laser delivery system is also connected to the carriage 30. The laser head 40 may receive its laser beam from any type of laser, be it $CO_2$, Nd:Yag, or the like.

From the foregoing description, it will be apparent from those of skill in the art that this invention provides multiple cutting heads in a single cutting cell whereby vibrations created in one cutting head is isolated from the other cutting head(s). The laser cutting cell has more than one cutting head in the cell, whereby each cutting head is supported by separate support structures to prevent the transfer of vibration from one cutting head to another. The multi-head laser cell includes a series of support structures that are staggered with respect to each other so that the lasers are isolated from each other. The x-direction rails and laser guides are mounted in staggered heights. Moreover, in the preferred embodiment, each laser cutting head has a dynamic pre-programmed operating zone to prevent collisions with other cutting heads.

While this invention has been shown and described with reference to a number of embodiments, it will be understood by those of skill in the art that various changes in form and detail may be made therein without departing from the spirit and scope of this invention.

What is claimed is:

1. A laser weld apparatus for welding at least one work piece, comprising:

a plurality of laser weld heads configured to movably project individual laser beams, respectively, onto an area of at least one work piece;

individual support structures separately supporting each of said plurality of laser weld heads in a single cell, wherein the individual support structures provide independent movement of each of said plurality of laser weld heads, wherein said individual support structures are staggered one with respect to another to locate said plurality of laser weld heads in said single cell.

2. The apparatus according to claim 1, wherein at least one of said individual support structures is a one-sided support structure.

3. The apparatus according to claim 1, wherein at least one of said individual support structures is a two-sided support structure.

4. The apparatus according to claim 1, wherein said laser cutting heads incorporate five-axes motion control.

5. The apparatus according to claim 1, further comprising a control system to prevent interference of each of said plurality of laser weld heads with said plurality of laser weld heads.

6. A laser cell comprising:

a first laser head adapted to project a first laser beam;

a second laser head adapted to project a second laser beam;

a first support structure supporting said first laser head; and a second support structure supporting said second laser head, wherein said first and second support structures allow independent movement of said first and second laser heads, and wherein said first and second support structures support said first and second laser heads at different levels whereby said first and second laser heads have free range of motion without interfering with each other.

7. The laser cell according to claim 6, wherein at least one of said first and second support structures is a one-sided support structure.

8. The laser cell according to claim 6, wherein at least one of said first and second support structures is a two-sided support structure.

9. The laser cell according to claim 6, wherein at least one of said first and second laser heads incorporate five-axes motion control.

10. The laser cell according to claim 6, further comprising a control system to prevent interference of each of said first and second laser heads with each other.

11. The laser cell according to claim 1, further comprising at least one additional laser head.

* * * * *